US009769332B1

(12) United States Patent
Delaunay et al.

(10) Patent No.: US 9,769,332 B1
(45) Date of Patent: Sep. 19, 2017

(54) CAMERA INTERCEPT DEVICE

(71) Applicant: Google Inc., Mountain View, CA (US)

(72) Inventors: Claire Delaunay, Palo Alto, CA (US); Matthew Amacker, Santa Clara, CA (US)

(73) Assignee: Google Inc., Mountain View, CA (US)

(*) Notice: Subject to any disclaimer, the term of this patent is extended or adjusted under 35 U.S.C. 154(b) by 464 days.

(21) Appl. No.: 14/134,942

(22) Filed: Dec. 19, 2013

Related U.S. Application Data

(60) Provisional application No. 61/829,960, filed on May 31, 2013.

(51) Int. Cl.
*H04N 7/18* (2006.01)
*H04N 1/00* (2006.01)
*H04N 7/14* (2006.01)

(52) U.S. Cl.
CPC ..... *H04N 1/00244* (2013.01); *H04N 1/00103* (2013.01); *H04N 7/147* (2013.01); *H04N 7/181* (2013.01)

(58) Field of Classification Search
CPC ........ H04W 12/02; H04L 63/30; H04L 63/00; H04N 1/00244; H04N 1/00103; H04N 7/147; H04N 7/181
See application file for complete search history.

(56) References Cited

U.S. PATENT DOCUMENTS

| | | | | |
|---|---|---|---|---|
| 7,028,335 B1* | 4/2006 | Borella | ............. | H04L 29/12367 370/389 |
| 8,831,505 B1* | 9/2014 | Seshadri | ................. | G09B 5/06 348/211.11 |
| 2012/0226544 A1* | 9/2012 | Merrifield | .......... | G06Q 30/0207 705/14.27 |
| 2013/0073576 A1* | 3/2013 | Lillethun | .............. | H04W 4/006 707/758 |
| 2015/0058709 A1* | 2/2015 | Zaletel | ..................... | G06F 3/14 715/202 |

OTHER PUBLICATIONS

LiveShell Dashboard, 'LiveShell Main Specifications,' retrieved from internet on Nov. 8, 2012, http://static-shell.cerevo.com/first/en/spec.html, 2 pages.
Digital Photography Review, 'Panasonic unveils Lumix DMC-SZ5 Wi-Fi capable compact superzoom,' Jul. 18, 2012, 7 pages.
LiveShell Dashboard, 'LiveShell Key Features,' retrieved from internet on Nov. 8, 2012, http://static-shell.cerevo.com/first/en/feature.html, 2 pages.

\* cited by examiner

*Primary Examiner* — Sath V Perungavoor
*Assistant Examiner* — Xiaolan Xu
(74) *Attorney, Agent, or Firm* — Fish & Richardson P.C.

(57) ABSTRACT

Methods, systems, and apparatus, including computer programs encoded on a computer storage medium, for routing video feeds from different types of cameras to a server over a data communications network. In one aspect, a method performed by a camera intercept device includes identifying at least first and second cameras; configuring, using a first configuration procedure, the first camera to transmit a first video feed to the camera intercept device; configuring, using a second configuration procedure different from the first configuration procedure, the second camera to transmit a second video feed to the camera intercept device; and routing the first and second video feeds to a server over a data communications network using the wireless communications module.

16 Claims, 5 Drawing Sheets

CAMERA INTERCEPT DEVICE

CROSS-REFERENCE TO RELATED APPLICATIONS

This application claims priority to U.S. Provisional Application Ser. No. 61/829,960, filed May 31, 2013, the entire contents of which are hereby incorporated by reference.

BACKGROUND

This specification relates to cameras that are configured to transmit over a wireless network. Some cameras, e.g., security cameras, are produced with proprietary software stacks on the cameras that enable the cameras to transmit video feeds to a known central server. The hardware of those cameras is proprietary and specially designed to communicate with the proprietary stack. Various other cameras have different communication set-up procedures from each other and are not often designed for use by consumers that are relatively unsophisticated in device networks. Consequently, some users may have difficulty in setting up cameras to stream to a network.

SUMMARY

This specification describes technologies relating to camera intercept devices, and particularly to camera intercept devices configured to communicate with different types of cameras.

In general, one innovative aspect of the subject matter described in this specification can be embodied in methods performed by a camera intercept device that include the actions of identifying at least first and second cameras; configuring, using a first configuration procedure, the first camera to transmit a first video feed to the camera intercept device; configuring, using a second configuration procedure different from the first configuration procedure, the second camera to transmit a second video feed to the camera intercept device; and routing the first and second video feeds to a server over a data communications network using the wireless communications module. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

These and other embodiments can include one or more of the following optional features. Identifying the first and second cameras comprises polling for cameras by a wireless communications module. Configuring the first and second cameras comprises: querying the first and second cameras for camera type identification information and receiving a first camera type from the first camera and a second camera type from the second camera; selecting the first configuration procedure from a plurality of configuration procedures stored in a memory using the first camera type; and selecting the second configuration procedure from the plurality of configuration procedures using the second camera type. Routing the first and second video feeds comprises sending the first and second video feeds, via a local Wi-Fi router hosting a local Wi-Fi network, to a different network outside the local Wi-Fi network. The actions further include establishing a bidirectional communication interface between the different network and the first and second cameras, including translating one or more messages from the server from an addressing scheme of the different network to a local addressing scheme. The local Wi-Fi router comprises a mobile device communicating with the Internet via a cellular network. Routing the first and second video feeds to a server comprises sending the first and second video feeds to a social networking server so that the social networking server includes the first and second video feeds in a particular social networking session. The actions further include receiving a social networking session identifier from a user device; selecting a social networking configuration procedure from a plurality of different social networking configuration procedures stored in the memory using the social networking session identifier; executing the social networking configuration procedure to establish a connection with a social networking server; and sending the first and second video feeds to a social networking server so that the social networking server includes the first and second video feeds in a particular social networking session identified by the social networking session identifier.

The actions further include polling for cameras by a wireless communications module; sending a list of available cameras to a user device for display to a user; and receiving a selection of at least the first and second cameras from the list of available cameras by the user from the user device. The memory stores a plurality of existing configuration procedures for a plurality of different camera types, the method further comprising: receiving one or more update procedures for corresponding existing configuration procedures and replacing the corresponding existing configuration procedures with the update procedures; and receiving one or more new configuration procedures for new camera types and storing the new configuration procedures in the memory Particular embodiments of the subject matter described in this specification can be implemented so as to realize one or more of the following advantages. A camera intercept device can be produced that is small and inexpensive. The camera intercept device can join a local network and interface with network enabled cameras on the network. The camera intercept device can unify the network interfaces of the cameras into a user-facing application that can take video feeds from the cameras and route them to servers, e.g., social networking servers or video phone calling servers. Consequently, camera manufacturers can create simpler cameras, and users can more easily connect a variety of cameras to the network. The camera intercept device can include a battery or other power source, preserving camera battery life for taking photos. The camera intercept device makes it possible for the tethering that is available on cell phones and other mobiles devices to be accessed by unsophisticated Wi-Fi cameras and sent to social networking sessions for real-time or near real-time broadcast. The camera intercept module can be scriptable and thus can receive camera configuration procedures dynamically.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
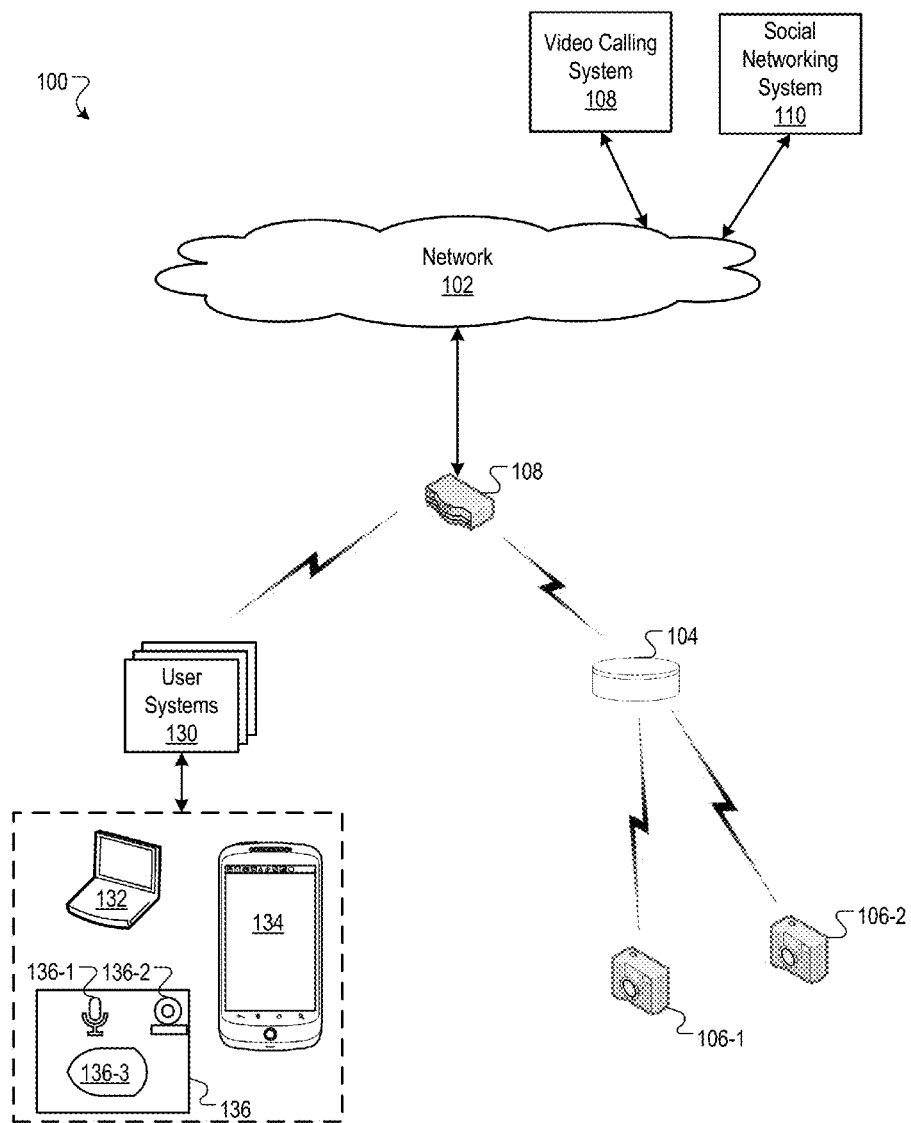
FIG. 1A is a block diagram of an example environment in which two or more cameras communicate over a data communications network using a camera intercept device.

FIG. 1A is a block diagram of an example environment 100 in which two or more cameras 106-1 and 106-2 communicate over a data communications network 102 using a camera intercept device 104.

The network 102 can include, for example, a local area network (LAN), a cellular phone network, a wide area network (WAN), e.g., the Internet, or a combination of them. The camera intercept device joins a local network hosted by a wireless router 108, e.g., a Wi-Fi router, connected to the network. The camera intercept device takes video feeds from the cameras and routes them to servers, e.g., a video phone calling system 108 or a social networking system 110 or both.

A user configures the camera intercept device 104 using a user device 130. A user device 130 is an electronic device, or collection of devices, that is capable of requesting and receiving resources over the network 102. Example user devices 130 include personal computers 132, mobile communication devices 134, and other devices that can send and receive data 136 over the network 102. A user device 130 typically includes a user application, e.g., a web browser, that sends and receives data over the network 102, generally in response to user actions.

The camera intercept device includes at least one processor, a memory, and a wireless communications module. The memory stores configuration procedures, including camera configuration procedures for configuring different types of cameras to transmit video feeds and session configuration procedures for connecting to the servers, e.g., video calling systems, social networking systems, and the like.

The camera configuration procedures can be provided by different manufacturers of cameras or derived by a manufacturer or designer of the camera intercept device and stored in the memory of the camera intercept device. For example, a manufacturer of the camera intercept device could purchase a variety of different cameras, read the instruction manuals for the cameras, test the cameras, and then develop and store the camera configuration procedures. Similarly, the session configuration procedures can be provided by system operations of video steaming systems or derived by a manufacturer or designer of the camera intercept device by interacting with the video streaming systems on a user device and recording steps for establishing a video feed to a session.

To configure the camera intercept device, the user sends an instruction to the camera intercept device to search for wireless enabled cameras within the range of the wireless communications module, e.g., by polling for cameras. The camera intercept device finds available cameras and determines a camera type for each available camera, e.g., by querying each available camera. The camera intercept device then sends a list of available cameras to the user system for display on the user system. The user selects cameras from the list, causing the camera intercept device to route the video feeds from the selected cameras to one or more of the servers.

In this manner, users can more easily connect a variety of cameras to the network. Users do not need to know the specific steps for configuring various types of cameras to transmit to various types of video sharing services. Camera manufacturers can create simpler cameras, e.g., that need only be programmed to interact with a camera intercept device and not with each different type of external server. The camera intercept device can include a battery or other power source, preserving camera battery life for taking photos.

Figure 1B:
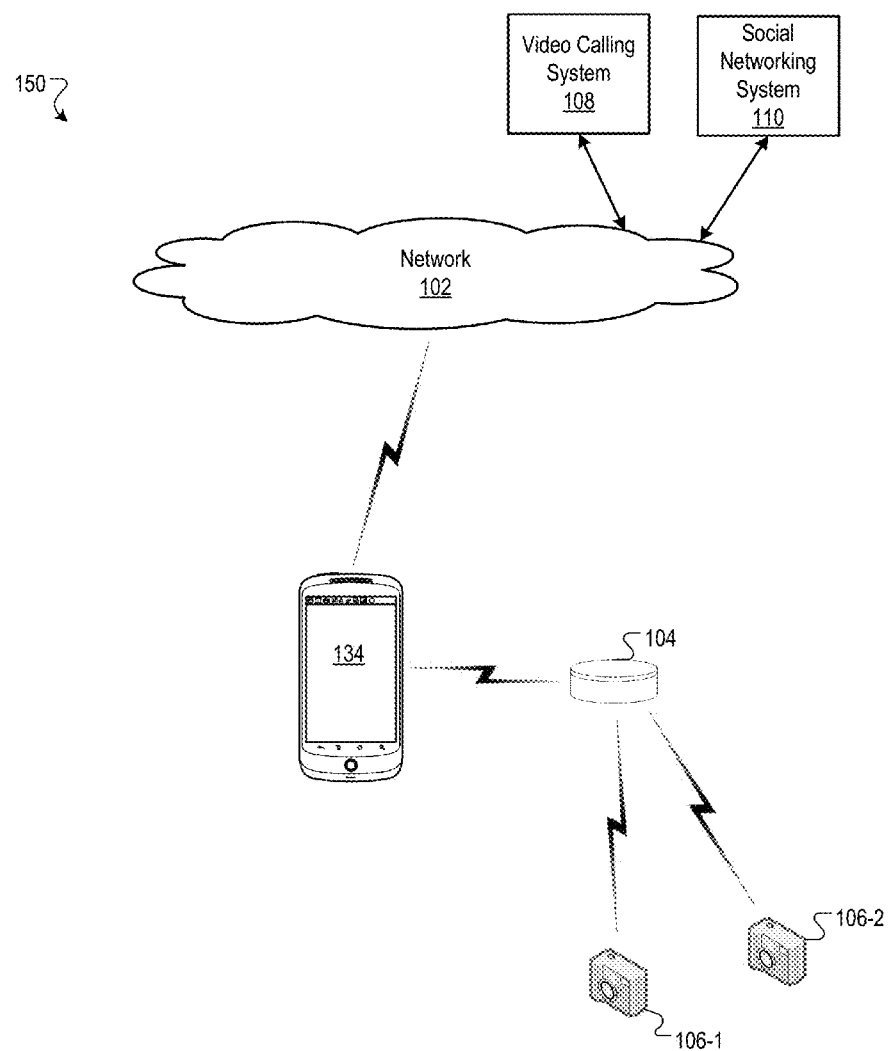
FIG. 1B is a block diagram of a different example environment in which the cameras communicate using the camera intercept device.

FIG. 1B is a block diagram of a different example environment 150 in which the cameras 106-1 and 106-2 communicate using the camera intercept device 104. In this example environment, the camera intercept device joins a local network hosted by a mobile communication device 134, e.g., by tethering to a mobile phone that connects to the network via a cellular network.

For example, suppose that the user wants to show his friends what it looks like to go mountain biking on a trail. The user first logs in to the social networking system, using the mobile phone, and establishes a social networking session, inviting the friends that he wants to witness the event. The user then pairs the camera intercept device with the mobile phone and a camera attached to his helmet. The camera can be any type of camera for which the camera intercept device has a camera configuration procedure stored in memory. Finally, the user causes the camera intercept to route the video feed from the camera to the social networking system, and then begins biking.

FIGS. 1A and 1B illustrate two different example environments, but the camera intercept device can be used in various different environments to serve as a bridge between one or more wireless cameras and a network. The camera intercept device can operate within various types of network topologies.

Figure 2:
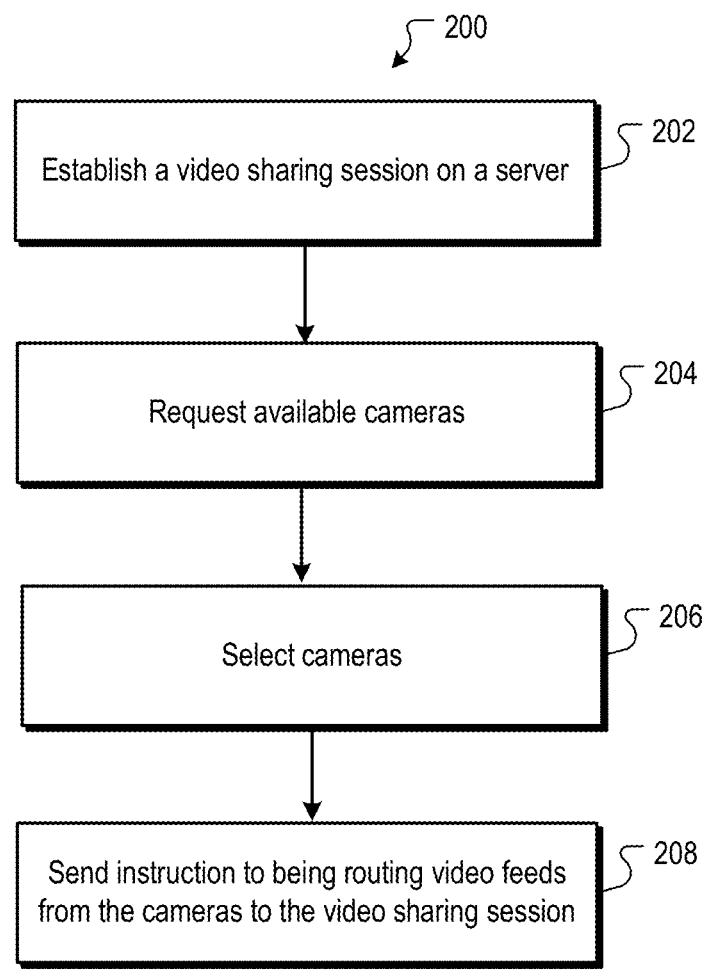
FIG. 2 is a flow diagram of an example method for configuring a camera intercept device.

FIG. 2 is a flow diagram of an example method 200 for configuring a camera intercept device. The method can be performed by a user on a user device.

The user establishes a video sharing session on a server (202). For example, the user can log in to a social networking server and establish a social networking session, including inviting other users to join the session and view one or more video feeds. The user requests a list of available cameras from the camera intercept device (204). Typically, the user sends a request to the camera intercept device, which then searches for available cameras.

The user selects one or more of the available cameras from the list (206). In some implementations, where the user has established a social networking session, the user can select the camera by inviting the camera to the session in the same or substantially the same way that the user invites other users to the session. The user sends an instruction to the camera intercept device to begin routing the video feeds from the selected cameras to the server (208). In some implementations, this happens automatically—without user intervention—after the user selects the cameras. In some implementations, the user sends, with the instruction, configuration information specifying the social networking session. The configuration information can include, e.g., a network address for the server, a session identifier for the session, and authentication information.

Figure 3:
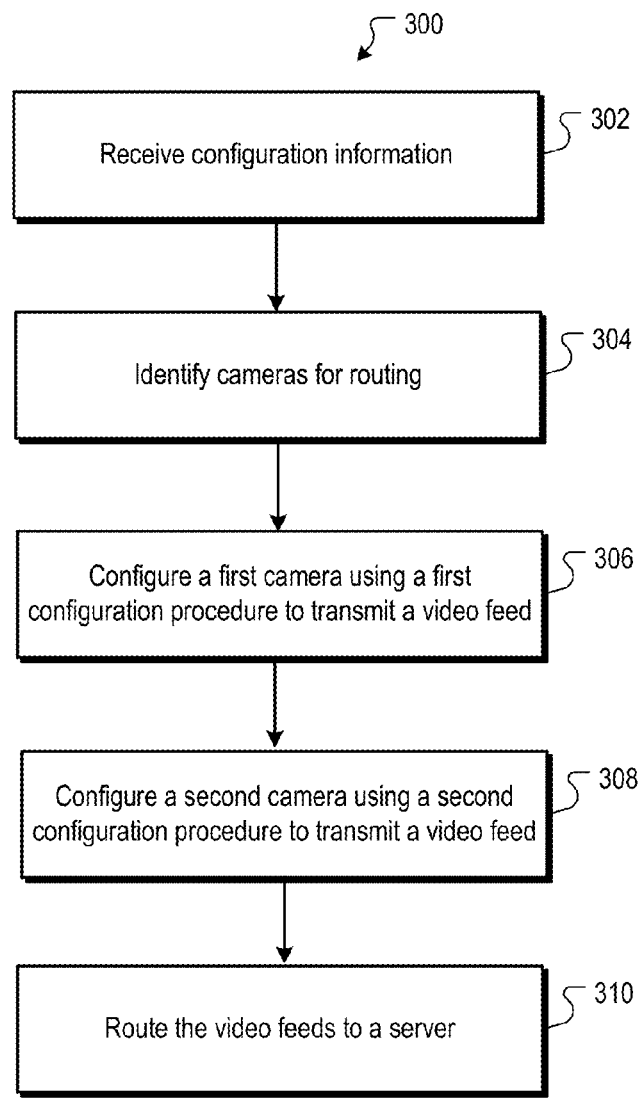
FIG. 3 is a flow diagram of an example method performed by a camera intercept device for routing video feeds.

FIG. 3 is a flow diagram of an example method 300 performed by a camera intercept device for routing video feeds.

The camera intercept device receives configuration information (302). For example, the camera intercept device can receive the configuration information from a user system or a user interface on the camera intercept device, e.g., a touch-screen display. The configuration information can include a session identifier, e.g., for a social networking session or a video calling session. The session identifier can identify a server and a particular session at the server.

The camera intercept device identifies at least first and second cameras (304). For example, the camera intercept device can poll for available cameras, and a user can select the first and second cameras from a list of available cameras, e.g., displayed on a user system or a user interface on the camera intercept device.

The camera intercept device configures, using a first configuration procedure, the first camera to transmit a first video feed to the camera intercept device (306). For example, the camera intercept device can query the first camera for camera type identification information and then select the first configuration procedure from a memory using the camera type identification information. In general, the camera intercept device sends a number of instructions to the first camera to cause the first camera to transmit the first video feed, but the first configuration procedure may also require the camera intercept device to receive some requests from the first camera and respond appropriately according to the first configuration procedure.

The camera intercept device configures, using a second configuration procedure different from the first configuration procedure, the second camera to transmit a second video feed to the camera intercept device (308). The camera intercept device can select the second configuration procedure using camera type identification information from the second camera.

The camera intercept device routes the first and second video feeds to a server identified by the configuration information over a data communications network (310). For example, the camera intercept device can send the first and second video feeds, via a local Wi-Fi router hosting a local Wi-Fi network, to a different network, e.g., the Internet, outside the local Wi-Fi network. The local Wi-Fi router can be a mobile device communicating with the Internet via a cellular network.

In some implementations, the camera intercept device establishes a bidirectional communication interface between the different network and the first and second cameras. The camera intercept can translate one or more messages from the server from an addressing scheme of the different network to a local addressing scheme. This is useful, for example, where the first and second cameras are not configured to have unique addresses on the different network.

For example, suppose that the different network is the Internet, using Transmission Control Protocol (TCP)/Internet Protocol (IP). The camera intercept device can be configured to act as a many-to-one network address translator (NAT) by hiding private IP addresses for the camera behind a public IP address for the camera intercept device. The camera intercept device can alter TCP ports in outgoing messages and maintain a translation table so that return messages can be correctly routed back.

In some implementations, the camera intercept device sends the first and second video feeds to a social networking server, specified by the configuration information, so that the social networking server so that the social networking server includes the first and second video feeds in a particular social networking session specified by the configuration information. For example, the camera intercept device can select a social networking configuration procedure from different social networking configuration procedures stored in memory and execute the selected configuration procedure to establish a connection with the social networking server.

Figure 4:
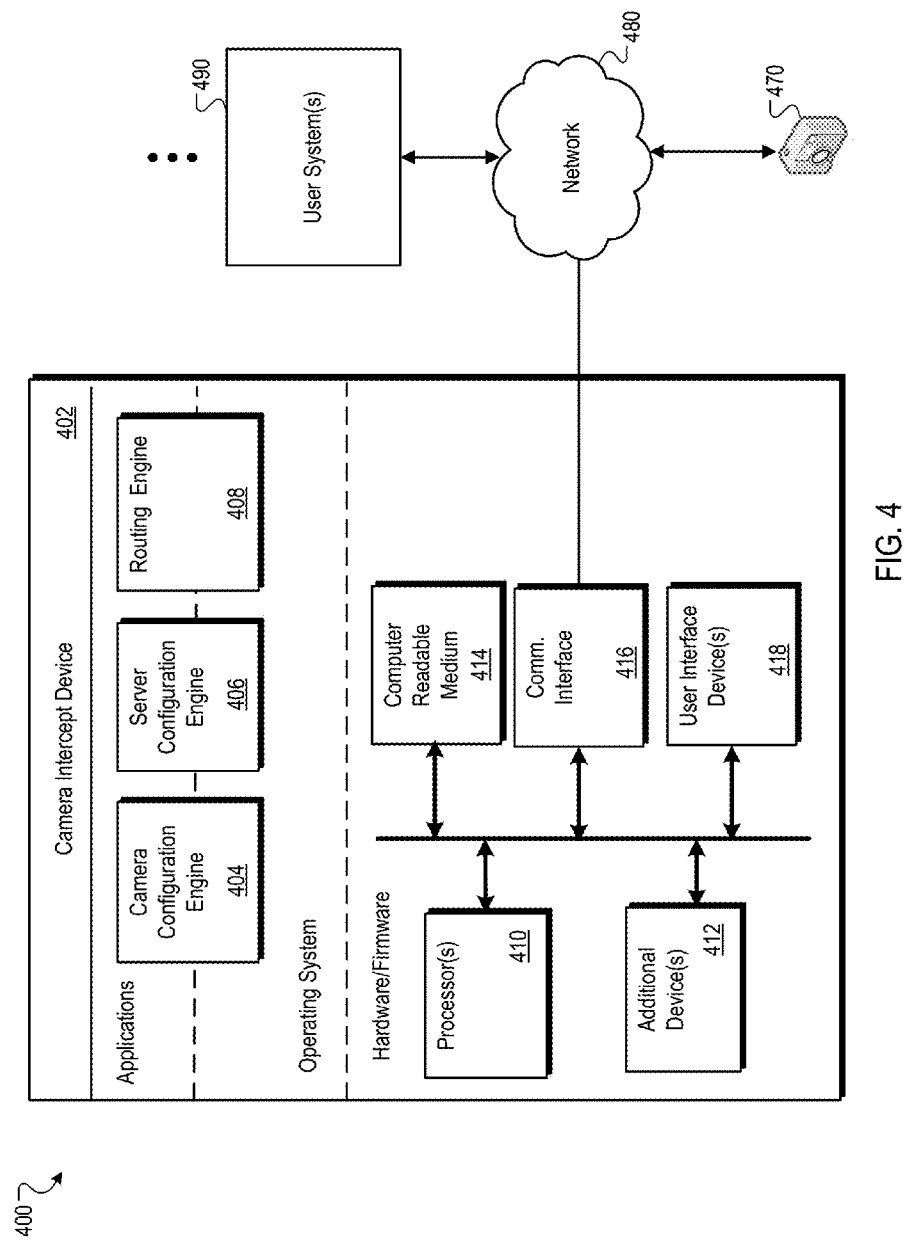
FIG. 4 is a diagram of an example camera intercept device.

FIG. 4 is a diagram of an example camera intercept device 402. In operation, the camera intercept device 402 communicates with one or more user systems 490 and one or more cameras 470 through a network 480.

The camera intercept device includes one or more data processing apparatus. The data processing apparatus can be enclosed in a small, handheld housing, e.g., shaped like a round puck or another shape. The housing can be sized and shaped to fit into a pocket.

The camera intercept device includes various modules, e.g., modules of computer program instructions, including a camera configuration engine 404 configured to execute camera configuration procedures; a server configuration engine 406 configured to execute server configuration procedures; and a routing engine 408 configured to manage or perform routing between cameras and servers. Each module is configured to run on the camera intercept device. For example, a module can run as part of an operating system on the camera intercept device, as an application on the camera intercept device, or as part of the operating system and part of an application on the camera intercept device. Although several software modules are illustrated, the functionality of the computing system may be implemented in fewer or more software modules. Moreover, the software modules can be distributed on one or more data processing apparatus connected by one or more networks or other suitable communication mediums.

The camera intercept device also includes hardware or firmware devices including one or more processors 410, one or more additional devices 412, a computer readable medium 414, a communication interface 416, and one or more user interface devices 418. Each processor 410 is capable of executing instructions for execution within the camera intercept device. Each processor 410 is capable of executing instructions stored on the computer readable medium 414 or on a storage device such as one of the additional devices 412. In some implementations, the camera intercept device includes one or more batteries or other power sources.

The camera intercept device uses its communication interface 416 to communicate with one or more user systems 490 and one or more cameras 470, for example, over a network 480. The communication interface can, in some implementations, communicate using Wi-Fi or a cellular network or both. Examples of user interface devices 418 include a display, a camera, a speaker, a microphone, a tactile feedback device. For example, the camera intercept device can include a small touch-screen display that can display a list of available cameras and that a user can use to select cameras for routing to a server.

The camera intercept device can store instructions that implement operations associated with the modules described above, for example, on the computer readable medium 414. The computer readable medium can also store camera configuration procedures and session configuration procedures. A manufacturer of the camera intercept device can record the configuration procedures during the manufacturing process, before device is sold. The configuration procedures can be provided to the manufacturer from camera manufacturers, or derived by the manufacturer for different types of cameras, e.g., popular cameras. The camera intercept device can be updated by storing additional configuration procedures in the computer readable medium and by replacing old configuration procedures with new configuration procedures.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A camera intercept device comprising:
   a wireless communications module;
   a memory storing instructions and a plurality of camera configuration procedures for a respective plurality of different camera types, each of the camera configuration procedures being instructions for configuring a particular type of camera to stream video to a network by wirelessly transmitting a video feed; and
   a processor configured to execute the instructions in the memory and perform operations comprising:
      identifying, over a local network, at least first and second cameras;
      querying, over the local network, the first and second cameras for camera type identification information and receiving, in response to each query, a first camera type from the first camera and a second camera type from the second camera;
      selecting a first configuration procedure from a plurality of configuration procedures stored in the memory using the first camera type, the first configuration procedure specifying first instructions for the first camera that cause the first camera to wireless transmit a video feed to the camera intercept device;
      selecting a second configuration procedure from the plurality of configuration procedures using the second camera type, the second configuration procedure specifying second instructions for the second camera that cause the second camera to wireless transmit a video feed to the camera intercept device, the second configuration procedure being different from the first configuration procedure, including the second instructions being different from the first instructions;
      configuring, over the local network, using the first configuration procedure, the first camera to transmit a first video feed to the camera intercept device, the configuring including sending the first instructions to the first camera that cause the first camera to transmit the video feed in response to being configured according the first instructions;
      configuring, over the local network, using the second configuration procedure different from the first configuration procedure, the second camera to transmit a second video feed to the camera intercept device, the configuring including sending the second instructions to the second camera that cause the second camera to transmit the video feed in response to being configured according the second instructions;
      establishing a bidirectional communication interface between a second network and the first and second cameras, wherein a server communicates over the second network, the establishing including translating one or more messages from the server from an addressing scheme of the second network to a local addressing scheme of the local network to communicate with the first and second cameras, wherein the second network is different than the local network; and
      routing, using the wireless communications module, the first and second video feeds over the local network for delivery to a server.

2. The camera intercept device of claim 1, wherein identifying the first and second cameras comprises polling for cameras by the wireless communications module.

3. The camera intercept device of claim 1, wherein routing the first and second video feeds comprises sending the first and second video feeds, via a local Wi-Fi router hosting a local Wi-Fi network, to a different network outside the local Wi-Fi network.

4. The camera intercept device of claim 3, wherein the local Wi-Fi router comprises a mobile device communicating with the Internet via a cellular network.

5. The camera intercept device of claim 1, wherein routing the first and second video feeds to a server comprises sending the first and second video feeds to a social networking server so that the social networking server includes the first and second video feeds in a particular social networking session.

6. The camera intercept device of claim 1, the operations further comprising:
   receiving a social networking session identifier from a user device;
   selecting a social networking configuration procedure from a plurality of different social networking configuration procedures stored in the memory using the social networking session identifier;
   executing the social networking configuration procedure to establish a connection with a social networking server; and
   sending the first and second video feeds to a social networking server so that the social networking server includes the first and second video feeds in a particular social networking session identified by the social networking session identifier.

7. The camera intercept device of claim 1, the operations further comprising:
   polling for cameras by the wireless communications module;
   sending a list of available cameras to a user device for display to a user; and
   receiving a selection of at least the first and second cameras from the list of available cameras by the user from the user device.

8. The camera intercept module of claim 1, wherein the memory stores a plurality of existing configuration procedures for a plurality of different camera types, the operations further comprising:
   receiving one or more update procedures for corresponding existing configuration procedures and replacing the corresponding existing configuration procedures with the update procedures; and
   receiving one or more new configuration procedures for new camera types and storing the new configuration procedures in the memory.

9. A method performed by a camera intercept device, the method comprising:
   storing, in a memory of the camera intercept device, a plurality of camera configuration procedures for a respective plurality of different camera types, each of the camera configuration procedures being instructions for configuring a particular type of camera to stream video to a network by wirelessly transmitting a video feed;

identifying, over a local network, at least first and second cameras;

querying, over the local network, the first and second cameras for camera type identification information and receiving, in response to each query, a first camera type from the first camera and a second camera type from the second camera;

selecting a first configuration procedure from a plurality of configuration procedures stored in the memory using the first camera type, the first configuration procedure specifying first instructions for the first camera that cause the first camera to wireless transmit a video feed to the camera intercept device;

selecting a second configuration procedure from the plurality of configuration procedures using the second camera type, the second configuration procedure specifying second instructions for the second camera that cause the second camera to wireless transmit a video feed to the camera intercept device, the second configuration procedure being different from the first configuration procedure, including the second instructions being different from the first instructions;

configuring, over the local network, using the first configuration procedure, the first camera to transmit a first video feed to the camera intercept device, the configuring including sending the first instructions to the first camera that cause the first camera to transmit the video feed in response to being configured according to the first instructions;

configuring, over the local network, using the second configuration procedure different from the first configuration procedure, the second camera to transmit a second video feed to the camera intercept device, the configuring including sending the second instructions to the second camera that cause the second camera to transmit the video feed in response to being configured according to the second instructions;

establishing a bidirectional communication interface between a second network and the first and second cameras, wherein a server communicates over the second network, the establishing including translating one or more messages from the server from an addressing scheme of the second network to a local addressing scheme of the local network to communicate with the first and second cameras, wherein the second network is different than the local network; and routing, using the wireless communications module, the first and second video feeds over the local network for delivery to a server.

10. The method of claim 9, wherein identifying the first and second cameras comprises polling for cameras by a wireless communications module.

11. The method of claim 9, wherein routing the first and second video feeds comprises sending the first and second video feeds, via a local Wi-Fi router hosting a local Wi-Fi network, to a different network outside the local Wi-Fi network.

12. The method of claim 11, wherein the local Wi-Fi router comprises a mobile device communicating with the Internet via a cellular network.

13. The method of claim 9, wherein routing the first and second video feeds to a server comprises sending the first and second video feeds to a social networking server so that the social networking server includes the first and second video feeds in a particular social networking session.

14. The method of claim 9, further comprising:
receiving a social networking session identifier from a user device;
selecting a social networking configuration procedure from a plurality of different social networking configuration procedures stored in the memory using the social networking session identifier;
executing the social networking configuration procedure to establish a connection with a social networking server; and
sending the first and second video feeds to a social networking server so that the social networking server includes the first and second video feeds in a particular social networking session identified by the social networking session identifier.

15. The method of claim 9, further comprising:
polling for cameras by a wireless communications module;
sending a list of available cameras to a user device for display to a user; and
receiving a selection of at least the first and second cameras from the list of available cameras by the user from the user device.

16. The method of claim 9, wherein the memory stores a plurality of existing configuration procedures for a plurality of different camera types, the method further comprising:
receiving one or more update procedures for corresponding existing configuration procedures and replacing the corresponding existing configuration procedures with the update procedures; and
receiving one or more new configuration procedures for new camera types and storing the new configuration procedures in the memory.

* * * * *